A. BÜCHI.
ENGINE INSTALLATION FOR SHIPS.
APPLICATION FILED MAY 22, 1912.
1,051,309.
Patented Jan. 21, 1913.
2 SHEETS—SHEET 1.
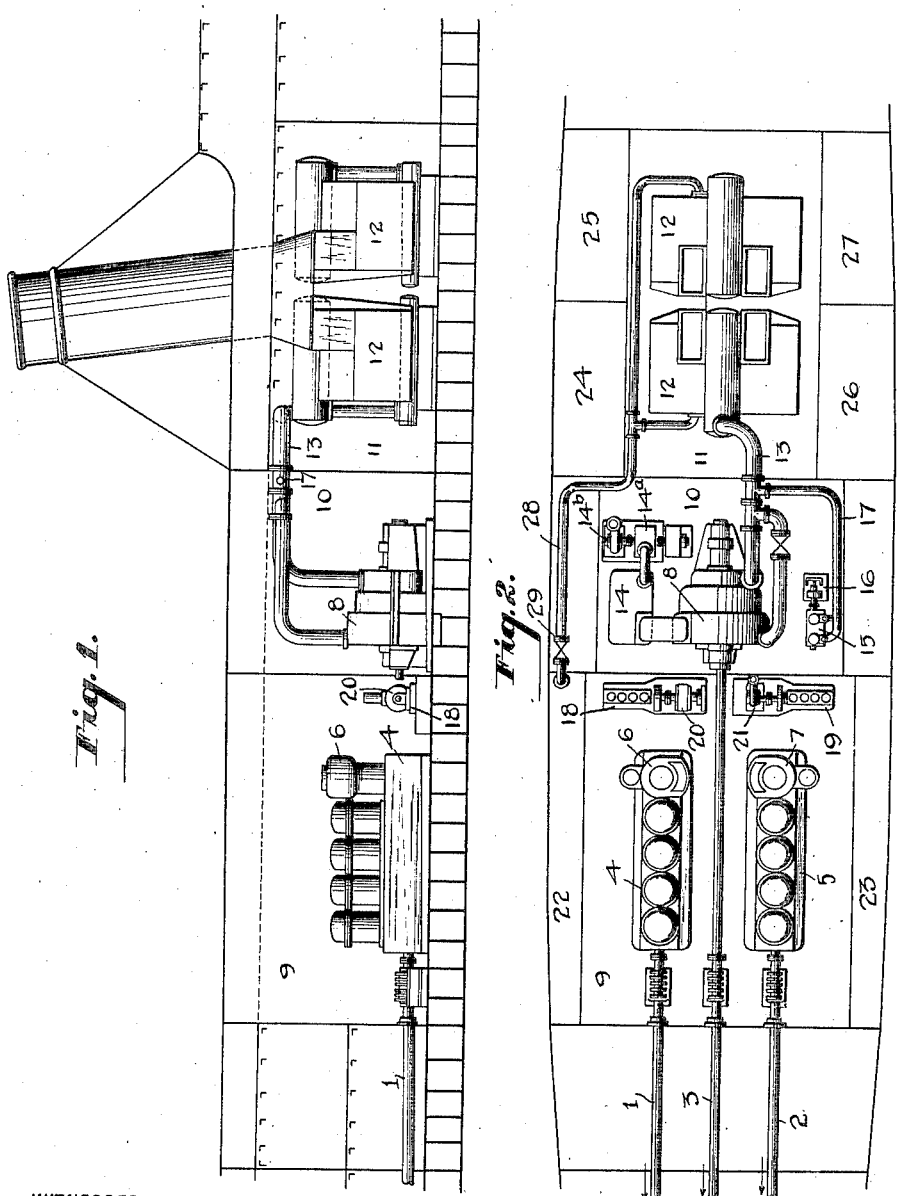

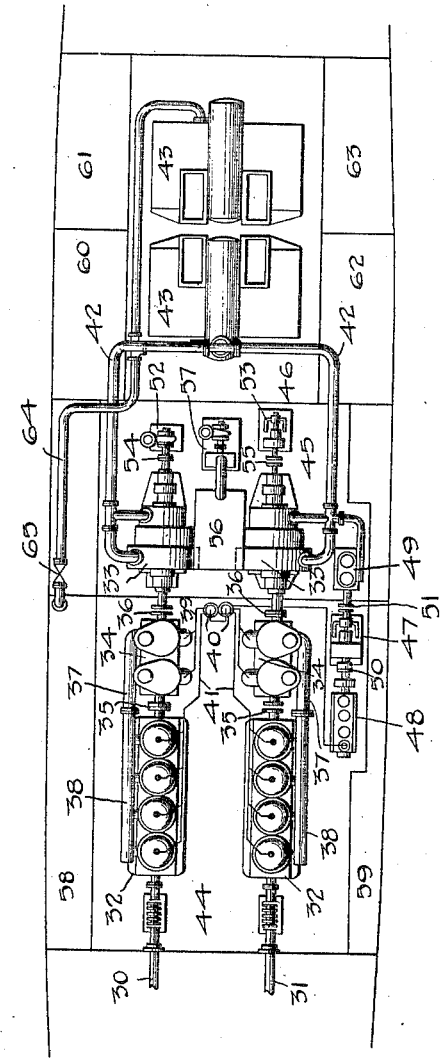

UNITED STATES PATENT OFFICE.

ALFRED BÜCHI, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

ENGINE INSTALLATION FOR SHIPS.

1,051,309.  Specification of Letters Patent.  Patented Jan. 21, 1913.

Application filed May 22, 1912. Serial No. 699,068.

*To all whom it may concern:*

Be it known that I, ALFRED BÜCHI, engineer, a citizen of the Republic of Switzerland, and a resident of Winterthur, Canton of Zurich, Switzerland, have invented certain new and useful Improvements in Engine Installation for Ships, as hereinbelow described.

This invention relates more particularly to the constitution and arrangement of marine power plants for ship drive, the object being to provide a mixed drive, whereby certain advantages are attained in the way of flexibility of operation together with the ability to run advantageously on different kinds of fuel. At different times and places and by reason of various conditions, as inflammability of cargo, labor strikes and disablement of driving machinery, one kind of fuel may be unduly expensive, unattainable, useless, or otherwise undesirable, and the ability to operate with a different kind of fuel would then be of the greatest advantage. Thus, it is extremely desirable that a vessel be able to develop power for propulsion either with coal or oil or both. This may be accomplished by adapting a steam plant to use oil as well as coal, and in fact such an arrangement is herein included as an ancillary feature; but primarily the present invention attains the desired result, more advantageously, by providing one or more engines specially adapted to develop power economically from the liquid part of the fuel supply, steam engines of a type well suited to combine with these oil motors being also provided to utilize the energy stored in the solid part of the fuel supply. Accordingly two-cycle Diesel engines, or like suitable constant pressure combustion engines and steam turbines are combined with the propellers in such manner that the vessel may be driven by either or both of the power plants. To complete the adaptability of the vessel thus equipped to all conditions that may arise, the steam-boiler installation is fitted to burn oil as well as coal, and a valved connection is provided between the oil tanks supplying the Diesel engines and this steam-boiler installation. In addition to the ability thus attained of selecting the fuel in accordance with conditions of market price, availability, etc., a material advantage is secured in that the two kinds of propulsion available according to their respective advantages with reference to different situations. Thus, the Diesel engines, alone, or in conjunction with the steam turbines, may be used for quick runs, and the steam drive alone may be used for slower speeds. The combination of Diesel engines and steam turbines as an economical and effective mixed drive for vessels results in a still further possibility, herein availed of, in respect to interchangeable driving of the pumps for supplying the Diesel engines with air. The kinds of air thus supplied are air for scavenging the cylinders and for compression therein by the pistons, and air (fuel air) for atomizing and injecting the liquid fuel into these bodies of compressed air in the cylinders. In accordance with this invention these pumps are arranged to be driven either by the Diesel engines which they serve, or by the turbines, the Diesel engines thus being left free to develop their greatest power, or by both jointly. To this end, the pump is preferably arranged between the Diesel engine and turbine pertaining to a propeller shaft, in line with all of these, and connections are provided whereby the pump may be coupled to either or both of the motors. When the turbine alone drives the pump it is disconnected from the propeller shaft, which is driven by the Diesel engine. Or the pump may be disconnected from the turbine and connected to the Diesel engine, which drives both the propeller shaft and its pump. Finally, the turbine may be connected to the propeller shaft through the pump, in which event the Diesel engine and pump may either be working or driven idly by the turbine.

Among other features of the invention are that of the isolation of the several installations, Diesel engines, turbines, and steam-boiler, all in separate water-tight compartments.

In the accompanying drawings illustrating the invention by two of the preferred embodiments, the showing being somewhat diagrammatic: Figure 1 is a vertical longitudinal section through a vessel, showing the separate water-tight compartments and the several installations therein; Fig. 2 is a sectional plan of the same; and Fig. 3 is a sectional plan of another arrangement.

In the construction shown in Figs. 1 and 2, the Diesel engines and the steam turbines drive different propellers. Thus, two outside propellers are represented by the propeller shafts 1 and 2, and a middle propeller by the shaft 3. The propeller shafts 1 and 2 are shown driven by Diesel engines 4 and 5 direct connected thereto. These engines may have any suitable number of cylinders, and their pumps, which may be direct connected with them, are indicated at 6 and 7. The construction and mode of operation of such engines are well understood, and detailed illustration and description are therefore unnecessary. The middle propeller shaft 3 is driven by a steam turbine 8 direct connected thereto. The Diesel engines 4 and 5 and the steam turbine 8 are located in separate water-tight compartments 9 and 10, the turbine compartment 10 being preferably in advance of the compartment 9, and the shaft 3 accordingly extending farther forward than the shafts 1 and 2. In a third water-tight compartment 11, located in advance of the other two, is the steam boiler installation 12, 12, consisting of one or more furnaces and boilers of any suitable or approved type. The steam is supplied to the turbine through a pipe 13; and the exhaust steam passes to a condenser 14, in which a vacuum is maintained by water and air pumps 14ª and 14ᵇ. In the turbine compartment 10 may be located one or more auxiliary steam turbines 15, for driving any kind of machines, as dynamos, bilge-pumps, etc. A driven machine is indicated at 16; and 17 is a branch steam pipe for supplying this auxiliary turbine. In like manner, auxiliary Diesel engines, as 18 and 19, may be located in the compartment 9, and used to drive any desired machines, different kinds of such machines being indicated at 20 and 21. The fuel tanks for containing the oil for the Diesel engines may be located at the sides of the compartment 9, as indicated at 22 and 23. The steam-boiler furnace or furnaces in the compartment 11 are constructed to burn oil as well as coal, in a manner which need not be described. The coal bunkers are indicated at 24, 25, 26, 27, at the sides of the compartment. A conduit 28 leads from the oil tank 22 to the compartment 11, where it terminates in the furnace or furnaces with suitable devices (not shown) for introducing and burning the liquid fuel. This conduit is controlled by a valve which is indicated at 29 and may be located at any suitable point.

In the form of the invention shown in Fig. 3, two propeller shafts 30 and 31 are indicated. Each of these may be driven by a Diesel engine 32 or by a steam turbine 33, or by both. In the preferred construction, each Diesel engine is direct connected to its propeller shaft, and the turbine is separate but co-axial therewith. Between the Diesel engine and the turbine, and also co-axial, is the pump 34, for supplying the Diesel engine. The shaft of the pump may be coupled with either the shaft of the Diesel engine or of the turbine, or with both, by clutches or couplings 35, 36. Thus the pump may be driven by either of the motors, and the turbine may either be connected with or disconnected from the propeller shaft. For example, for reversing, when it may be desirable to develop the maximum power on the propeller shafts, the turbines may be disconnected therefrom and connected with the pumps, the Diesel engines driving the propellers thus being relieved of the burden of the pumps. Moreover, it is possible to reverse the movement of the vessel by reversing the Diesel engines, and without reversing either the turbines or the pumps, which, coupled together and uncoupled from the propeller shafts, may continue to run in the same direction as before. Other desirable variations of drive are possible. The construction and arrangement of the Diesel engines and their pumps need not be described or illustrated in detail, because these engines are well understood. The pumps may be two or three stage compressors, as desired. A conduit 37 is indicated for leading air under relatively low pressure to the receiver or manifold 38, which is connected with the scavenging ports suitably placed in the sides of the cylinders of the engine. Lines for leading more highly compressed air are indicated at 39, and devices for controlling this air are indicated at 40. Such air thence passes by pipes marked 41 leading to the fuel valves, in the tops of the several cylinders. The turbines are supplied with steam by the pipes 42 leading from the steam boiler installations 43, the latter consisting of one or more furnaces and boilers of any approved type. The internal combustion engine, steam turbine and steam-boiler installations are all located in separate water-tight compartments, as in the case of Fig. 1, and numbered 44, 45, 46, the compartment containing the Diesel engines being preferably farthest aft and the steam boiler compartment farthest forward, with the steam turbine compartment between. In the internal combustion engine compartment 44 may be located one or more machines independent of the propeller shafts and of various characters, such as dynamos, bilge-pumps, etc. One such machine is indicated at 47. Such machines are desirably arranged between and co-axial with the Diesel engines and the steam-engines, so as to be driven by either or both thereof, such auxiliary internal combustion and steam-engines being located respectively in the compartments 44, 45, reserved for internal combustion engine and steam-engine installations. For driving the machine 47 an auxiliary Diesel engine is indicated at 48, in the compartment 44, and a steam-engine 49, in the compartment 45. Clutches or couplings 50 and 51 are provided for connecting the driven machine with either or both of its motors. In addition, machines of any suitable character, dynamos, bilge-pumps, etc., may be arranged at the ends of the propeller shaft lines in the compartment 45. Two such machines are indicated at 52 and 53, clutches or couplings 54, 55 being provided for connecting them with or disconnecting them from the turbine shafts. 56 is a condenser receiving the exhaust from the steam turbines and kept at partial vacuum by suitable pumps indicated at 57 and driven in any suitable manner. The oil tanks 58 and 59 for containing the fuel for the Diesel engines may be located at opposite sides of their compartment 44, as in the case of Figs. 1 and 2, and the furnace or furnaces of the steam-boiler installation are also adapted to burn oil as well as coal. The coal bunkers are indicated at 60, 61, 62, 63, at opposite sides of the compartment 46; and a conduit 64 controlled by a valve 65 leads from the oil tank 58 into the steam-boiler compartment, where it is arranged to supply the furnaces with liquid fuel. Thus the steam part of the propulsion may develop its power either from coal or oil, or both, according to conditions.

While various features of construction, arrangement and operation of the invention have been described, various other features and capabilities will be appreciated by those skilled in the art.

What is claimed as new is:

1. In a vessel, the combination with a propeller shaft, of a Diesel engine and a steam turbine both in the shaft line, an air pump for serving the Diesel engine arranged in the shaft line between the Diesel engine and turbine, and detachable couplings between the pump and the Diesel engine on the one hand and the turbine on the other.

2. In a vessel, the combination with a propeller shaft, of a Diesel engine connected thereto, a steam turbine in line with the propeller shaft and forward of said Diesel engine, an air pump for serving the Diesel engine arranged between and in line with the Diesel engine and steam turbine, and detachable couplings between the pump and the Diesel engine on the one hand and the steam turbine on the other.

3. In a power plant, the combination of a shaft to be driven, means for driving the same comprising a Diesel engine and another motor in line with each other and with the shaft, an air pump and connections for supplying said Diesel engine with the air necessary for its operation as a constant pressure internal combustion engine, and detachable couplings between said pump and the motors at opposite sides, whereby the shaft may be driven by one of said motors alone or by both jointly and the pump may be driven by the engine which it serves or by the other motor or by both.

In testimony whereof, I have signed this specification in the presence of two witnesses.

ALFRED BÜCHI.

Witnesses:
CARL GUBLER,
AUGUST RUEGG.